United States Patent
Evans

[19]

[11] Patent Number: 6,070,691
[45] Date of Patent: Jun. 6, 2000

[54] SELF-ALIGNING HYDRAULIC STEERING SYSTEM

[75] Inventor: Larry D. Evans, 1030 C&E Dr., Tignall, Ga. 30368

[73] Assignees: Jerry E. Hansen; Larry D. Evans, both of Carrollton, Ga.

[21] Appl. No.: 08/951,526

[22] Filed: Oct. 16, 1997

[51] Int. Cl.⁷ .................................................... B62D 5/12
[52] U.S. Cl. ......................... 180/433; 180/442; 92/181 P
[58] Field of Search .................... 180/400, 417, 180/432, 433, 439, 441, 442; 92/162 P, 181 P

[56] References Cited

U.S. PATENT DOCUMENTS

| | | | |
|---|---|---|---|
| 3,613,503 | 10/1971 | Phillips | 91/26 |
| 3,724,585 | 4/1973 | Conrad . | |
| 3,848,693 | 11/1974 | Sheppard | 180/432 |
| 3,896,617 | 7/1975 | Kraina | 60/403 |
| 3,957,129 | 5/1976 | Rau | 180/432 |
| 3,991,846 | 11/1976 | Chichester et al. . | |
| 4,090,581 | 5/1978 | Miner et al. . | |
| 4,114,720 | 9/1978 | Ericson et al. . | |
| 4,161,865 | 7/1979 | Day | 180/432 |
| 4,372,413 | 2/1983 | Peterson et al. | 180/417 |
| 4,723,475 | 2/1988 | Burk | 180/433 |
| 4,821,624 | 4/1989 | Smith | 91/401 |
| 5,161,822 | 11/1992 | Lund | 280/772 |
| 5,477,675 | 12/1995 | Ingraham et al. | 180/417 |
| 5,560,204 | 10/1996 | Ishihama et al. | 60/426 |
| 5,718,304 | 2/1998 | Lee | 180/433 |

FOREIGN PATENT DOCUMENTS 1121956  7/1968  United Kingdom .

*Primary Examiner*—Paul N. Dickson
*Assistant Examiner*—Avraham H. Lerner
*Attorney, Agent, or Firm*—Jones & Askew, LLP

[57] ABSTRACT

A self-aligning steering system for a vehicle having a steering wheel and a plurality of front wheels. The invention has a hydraulic fluid circulation means responsive to the steering wheel and a left and a right hydraulic cylinder for maneuvering the front wheels in response to the hydraulic fluid circulation system. The hydraulic cylinders have an internal fluid release system such that the volume of hydraulic fluid in the left and the right hydraulic cylinders is equalized through the hydraulic fluid circulation means. Equal hydraulic fluid volume ensures that the front wheels are in alignment.

24 Claims, 3 Drawing Sheets

SELF-ALIGNING HYDRAULIC STEERING SYSTEM

TECHNICAL FIELD

This invention relates to steering systems for vehicles and, more particularly, to a self-aligning hydraulic steering system.

BACKGROUND OF THE INVENTION

Typical vehicle steering systems, particularly automobile steering systems, generally employ a rack and pinion design. Generally described, steering is controlled by the steering wheel. The steering wheel is in turn connected to the pinion gear of the rack and pinion system via a linkage through the steering column. The rack is connected to the wheels via a linkage mechanism. The pinion gear engages the rack to translate the rotary motion of the steering wheel into longitudinal motion. As the driver turns the steering wheel, the pinion gear moves the rack which in turn guides the wheels. Other known systems include the use of a steering box with a worm gear and a Pittman arm.

Although these known system originally were relatively simple in principle, modern automobiles have complex steering systems due to the desire for high performance and the demand for high safety standards. Because of this complexity, modern steering systems generally are not maintained or aligned by the typical automobile owner. Rather, a professional mechanic with specialized equipment is recommended for most maintenance or alignment work.

Other types of steering systems, namely hydraulic systems, have been employed in utility vehicles, tractors, and other types of heavy equipment. These known hydraulic systems, however, also require a mechanic for routine maintenance because the addition or bleeding of hydraulic fluid is required to maintain the steering system in proper alignment.

What is needed, therefore, is a vehicle control system that is self-aligning or allows the typical driver to maintain proper alignment. Such a system would not require a professional mechanic to maintain the steering system in proper alignment.

SUMMARY OF THE INVENTION

Stated generally, the invention is a self-aligning steering system for a vehicle having a steering wheel and a plurality of front wheels. The invention has a hydraulic fluid circulation means responsive to the steering wheel and a left and a right hydraulic cylinder for maneuvering the front wheels in response to the hydraulic fluid circulation means. The hydraulic cylinders have an internal fluid release means such that the volume of hydraulic fluid in the left and the right hydraulic cylinders is equalized through the hydraulic fluid circulation means. Equal volume hydraulic fluid ensures that the front wheels are in alignment.

Specific embodiments include the hydraulic fluid circulation means having a hydraulic steering valve, a hydraulic pump, and a plurality of hydraulic lines for circulating the hydraulic fluid. The hydraulic fluid circulation means directs the flow of hydraulic fluid to and from the hydraulic cylinders in response to the steering wheel and also between the two hydraulic cylinders. The hydraulic cylinders have a piston rod with a piston head fixedly attached thereto and a stop mounted on the piston rod such that the piston head cannot contact a far wall of the cylinder. Location sensors may be positioned adjacent to the hydraulic cylinders to ensure the proper positioning of the piston rod and, hence, the wheels.

In response to the steering wheel turning to the left, the hydraulic fluid circulation system meters hydraulic fluid to the right side of the left hydraulic cylinder such the piston head within the left cylinder moves to the left. At the same time, the hydraulic fluid circulation system draws hydraulic fluid from the left side of the right cylinder such that the piston head within the right cylinder also moves to the left. As the piston heads move to the left within the cylinders, the piston heads force the piston rods to the left such that the wheels are steered to the left. The reverse takes place with a right hand turn.

If the steering wheel maintains the left turn such that the piston head continues all the way to the left in the left cylinder until the stops contact the far wall, a build up of hydraulic fluid occurs behind the piston head. The internal fluid release means in the piston head in the left cylinder then releases hydraulic fluid at a predetermined pressure. This hydraulic fluid is released to the right side of the right cylinder such that the volume of hydraulic fluid is equalized in both cylinder. The front wheels will be in alignment when the hydraulic fluid volume in both cylinders is equal.

Alternatively, the hydraulic steering system can have a hydraulic fluid circulation means responsive to the steering means, a first hydraulic cylinder with a first side, a second side, a piston head, and a piston rod functionally connected to the first front wheel, and a second hydraulic cylinder with a first side, a second side, a piston head, and a piston rod functionally connected to the second front wheel. The hydraulic fluid circulation means includes a first hydraulic line for transport of hydraulic fluid to and from the second side of the first cylinder and the second side of the second cylinder and a second hydraulic line for transport of fluid to and from the first side of the first cylinder and the first side of said second cylinder In response to the steering means turning in a first direction, the hydraulic fluid circulation means forces fluid to the second side of the first cylinder and the second side of the second cylinder and draws fluid from the first side of the first cylinder and the first side of the second cylinder such that the piston heads in each cylinder force the piston rods in the first direction so as to steer the wheels in that direction.

It is thus an object of the present invention to provide a self-aligning steering system.

It is another object of the present invention to provide a hydraulic steering system.

It is a further object of the present invention to provide a steering system that is easily alignable by the driver.

It is a still further object of the present invention to provide a steering system that can be self-aligned by merely turning the front wheels of the vehicle.

Other objects, features, and advantages of the present invention will become apparent upon reading the following specification when taken in connection with the drawings and the claims.

DETAILED DESCRIPTION OF THE INVENTION

Figure 1:
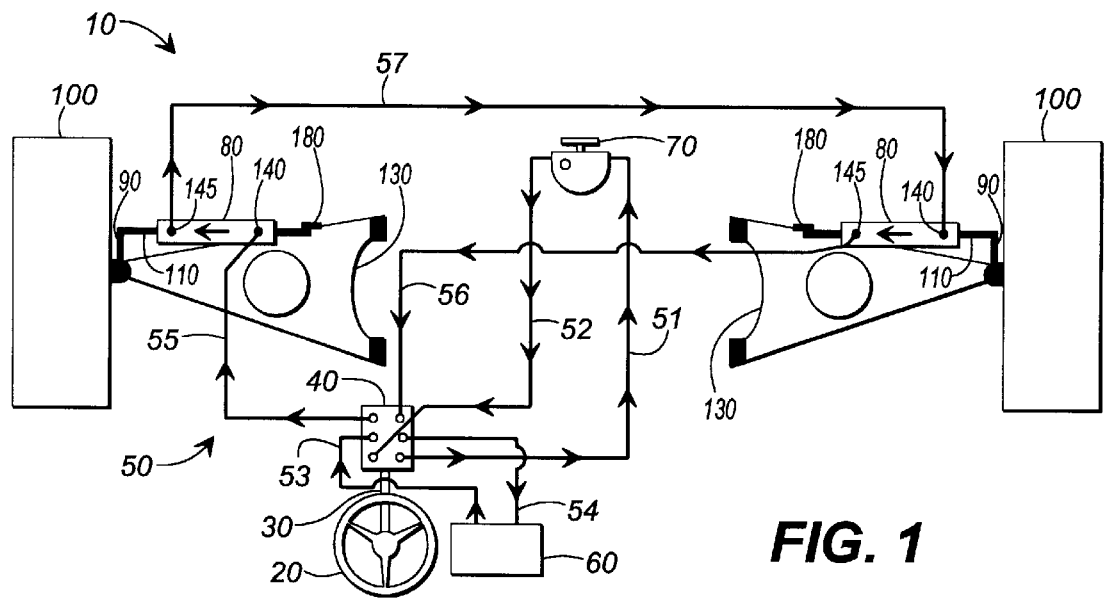
FIG. 1 is a schematic view of the components of the present invention in making a left hand turn.

Referring now to the drawings, in which like numerals represent like parts throughout the several views, FIGS. 1–4 show a preferred embodiment of the hydraulic steering system 10. The hydraulic steering system 10 generally includes a steering wheel 20, a steering column 30, a steering valve 40, a plurality of hydraulic lines 50, a reservoir 60, a hydraulic pump 70, at least two hydraulic cylinders 80, at least two steering arms 90, and at least two wheels 100.

The steering wheel 20 and the steering column 30 are of conventional design. The steering wheel 20 is functionally connected to the steering valve 40 via the steering column 30. The steering valve 40 is a hydraulic valve such a Char-Lynn valve. The hydraulic lines 50 can be any type of flexible tubing with a burst strength of at least 3,000 pounds per square inch. One of the hydraulic lines 50 may need to run in front of the radiator (not shown) of the vehicle to maintain the temperature of the hydraulic fluid at acceptable levels.

The hydraulic pump 70 is powered by the drive motor (not shown) of the vehicle via a belt, gear, chain or other conventional linkage. The hydraulic pump 70 is a conventional automotive pump. The hydraulic pump 70 preferably generates about 1700 to 2000 pounds per square inch of pressure for a typical passenger vehicle. The working pressure is believed to be about 70 to 80 pounds per square inch. The amount of pressure may vary with the type and purpose of vehicle, i.e., the pressure may be significantly higher in road construction vehicles. The reservoir 60 may be incorporated into the hydraulic pump 70 itself, or maybe a separate structure as is shown in the drawings. The steering valve 40, with the assistance of hydraulic pump 70, provides hydraulic fluid to the hydraulic cylinders 80 via the various hydraulic lines 50. The steering arms 90 and the wheels 100 are of conventional design.

Figure 4:
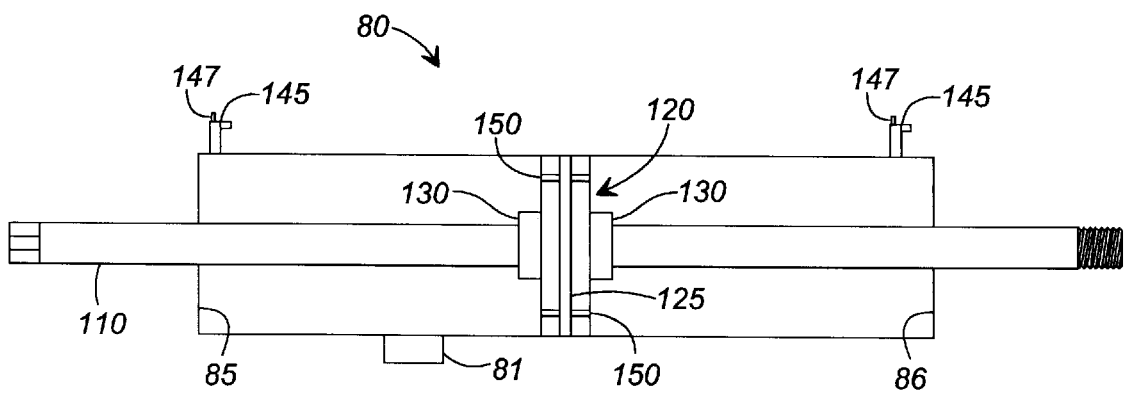
FIG. 4 is a side cross-sectional view of the cylinder.

FIG. 4 shows the internal workings of the hydraulic cylinder 80. The cylinder 80 is preferably a polysteel alloy, polished steel, other types of hardened steel, or similar materials. Each hydraulic cylinder 80 includes a piston rod 110, a piston head 120, a plurality of stops 130, a right hand fitting 140, and a left hand fitting 145. The piston head 120 is fixedly attached to the piston rod 110 and moves in a longitudinal direction within the cylinder 80. The piston head 120 is of conventional design and may have an outer seal or gasket 125 around its circumference to ensure both smooth movement within the cylinder 80 and a sufficient seal with the walls of the cylinder 80 to ensure that hydraulic fluid does not leak around the piston head 120. A suitable gasket is made from Teflon (polytetrafluoroethylene), rubber or other types of conventional materials. The fittings 140, 145 both incorporate a bleed-off valve 147. The bleed-off valves 147 allow air to escape from the cylinders 80 due to, for example, repair work. The bleed-off valves 147 are of conventional design, such as a screw at the apex of the fittings 140, 145.

Also mounted to the piston rod 110 are the stops 130 positioned on either side of the piston head 120. The stops 130 are preferably spacer blocks of a firm elastic material such as Teflon (polytetrafluoroethylene), but can be any type of solid material such as steel or other types of conventional materials. The stops 130 are positioned on the piston rod 110 to prevent the piston head 120 from contacting the far walls 85, 86 of the cylinder 80. The stops 130 ensure that the wheels 100 turn no more than a predetermined amount, typically about twenty-six (26) degrees. Alternatively, the stops 130 can be mounted outside the cylinder 80 on or adjacent to the A-frame 135 to limit the advance of the piston rod 110.

Positioned within the piston head 120 are one or more pop valves or poppets 150. A poppet 150 is any type of pressure release valve with a predetermine release point. Preferably, the poppets 150 are one-way pressure valves such as those sold by Aero Weld's Kwik Change Relief Valves or other types of conventional valves. At least two poppets 150 are positioned on the piston head 120, with one poppet 150 pointing in each direction.

Figure 3:
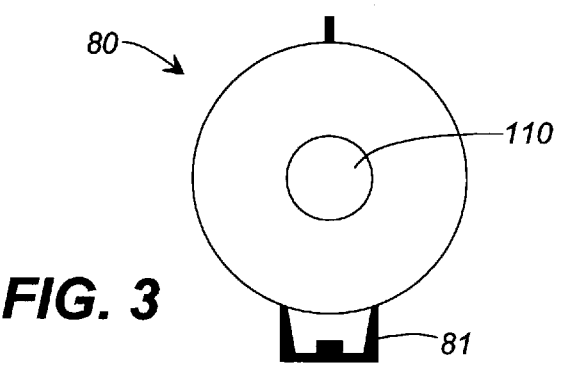
FIG. 3 is an end view of the hydraulic cylinder.

As is shown in FIG. 3, each hydraulic cylinder 80 has a mount 81 fixed thereon that is attached to the lower A-frame 135 of the vehicle via a ball joint, a spherical joint, or other conventional means. The piston rod 110 of the hydraulic cylinder 80 is in turn connected to the steering arm 90 by either a ball joint, a hem joint, or other conventional means. The position of the piston head 120 and the piston rod 110 within the cylinder 80 changes in response to the changes in hydraulic volume and pressure. The piston rod 110 moves the steering arm 90 and, hence the wheels 100, to steer the vehicle.

When the steering wheel 20 is not being moved, the hydraulic fluid in the system 10 is circulated between the steering valve 40 and the hydraulic pump 70 via an outlet hydraulic line 51 and an inlet hydraulic line 52. Hydraulic fluid is circulated into and through the system 10 from the reservoir 60 via an inlet reservoir line 53 and an outlet reservoir line 54.

When the steering wheel 20 is turned, the steering valve 40 meters out hydraulic fluid to the hydraulic cylinders 80 depending on which direction the steering wheel 20 is turned. As is shown in FIG. 1, if the steering wheel 20 is turned to the left, the steering valve 40 meters hydraulic fluid to the left hydraulic cylinder 80 via a left wheel hydraulic line 55. The hydraulic fluid from left wheel hydraulic line 55 enters the left cylinder 80 via the right hand cylinder fitting 140. The fluid volume forces the piston rod 110 and the piston head 120 to the left. As the piston head 120 moves to the left, hydraulic fluid on the left side of the piston head 120 is forced out of the cylinder 80 through the left hand cylinder fitting 145 into a recirculation hydraulic line 57. The recirculation hydraulic line 57 circulates fluid between the cylinder 80. The hydraulic fluid forced out of the left hand cylinder 80 travels into the right hydraulic cylinder 80 through the right hand hydraulic fitting 140.

While the hydraulic pump 70 and the steering valve 40 are forcing fluid to the left hydraulic cylinder 80, hydraulic fluid is simultaneously drained from the right hydraulic cylinder 80. The fluid is drained from the left hand side of the right cylinder 80 via the right wheel hydraulic line 56 connected from the left hand cylinder fitting 145 back to the steering valve 40. The negative hydraulic pressure on the piston head 120, in combination with the inflow of hydraulic fluid on the right side of the cylinder 80 from the recirculation line 57, moves the right piston head 120 to the left.

Figure 2:
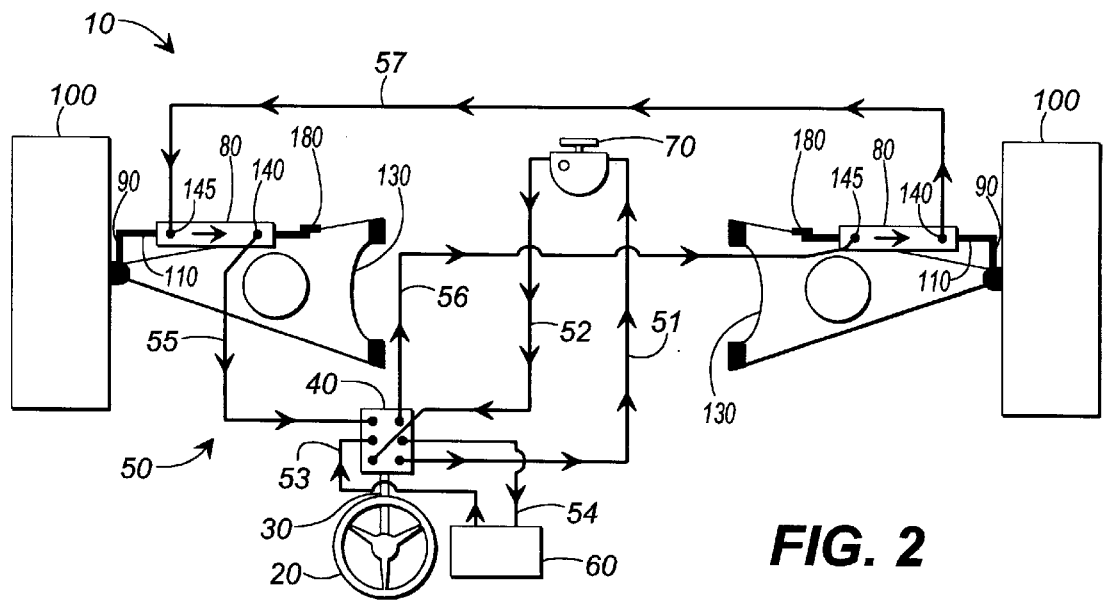
FIG. 2 is a schematic view of the components of the present invention in making a right hand turn.

As the respective piston rods 110 and piston heads 120 are forced to the left, the piston rods 110 in turn force the respective steering arms 90 to the left, thereby causing the wheels 100 to move to the left and to steer the vehicle to the left. FIG. 2 shows a right hand turn.

The fluid volume within each cylinder 80 can be equalized, and hence the wheels 100 can be properly aligned, through the use of the poppets 150. If, for example, the right front tire is toed-out one half inch, the driver merely needs to turn the steering wheel 20 to the left until resistance is felt. By turning the steering wheel to the left, the steering valve 40 forces fluid through the left wheel line 55 to the left cylinder 80 as described above. If the driver continues to hold the steering wheel 20 all the way to the left, the hydraulic fluid forces the piston head 120 all the way to the left of the cylinder 80 until the stop 130 contacts the far cylinder wall 85. Once the piston head 120 moves as far to the left as it can, a build up of fluid will be generated in the right side of the cylinder 80 behind the piston head 120. This fluid build up causes the poppets 150 to open and release hydraulic fluid into the left hand side of the left cylinder 80 and out of left hand cylinder fitting 145. If the normal working pressure within the cylinder 80 is about 70 to 80 pounds per square inch, the poppet 150 may be set to open at about 100 to 125 pounds per square inch or more.

The released hydraulic fluid travels through the recirculation line 57 to the right hand fitting 140 of the right cylinder 80. This extra hydraulic fluid also forces the right piston head 120 to the left of the right cylinder 80 until the stop 130 contacts the far cylinder wall 85. Once the piston head 120 reaches the far cylinder wall 85, an equal amount of fluid will be present in both cylinders 80. Because the volume in both cylinders 80 is equal, both wheels 100 are now in alignment and the toe-out is corrected.

An indication of the proper alignment can be monitored and provided to the driver. Two location sensors 180 are positioned adjacent to the steering arm 90 or other convenient location. The location sensors 180 are conventional micro-switches or "fuzzy" sensors with a time delay to accommodate normal steering. If the respective piston rods 120 are not in their predetermined location adjacent to the location sensors 180, the change will be detected and an appropriate warning light may appear on the dash.

Another benefit of the present invention is that it will largely eliminate "bump" steer. Bump steer is a racing term that signifies the turning of the wheels while the steering remains stationary due to movement in the suspension. Bump steer is avoided because the steering cylinder 80 is on the same radius as the lower A-frame 130. This design also helps to eliminate tire wear due to tire scrub. Further, the poppets 150 essentially act as a shock absorber for the complete steering system 10.

Figure 5:
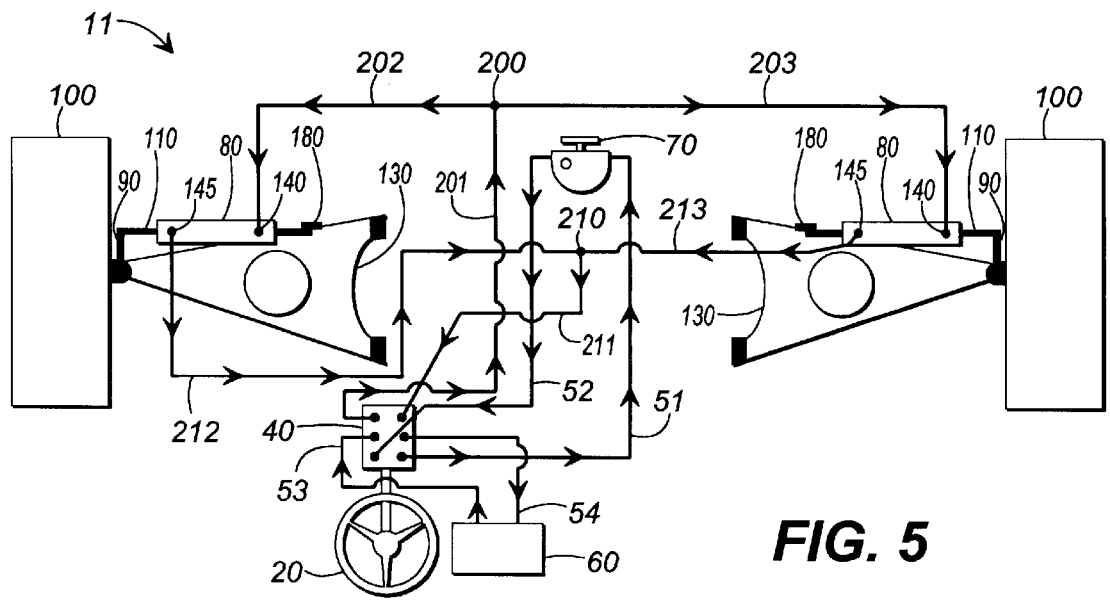
FIG. 5 is a schematic view of the components of the second embodiment of the present invention in making a left hand turn.
Figure 6:
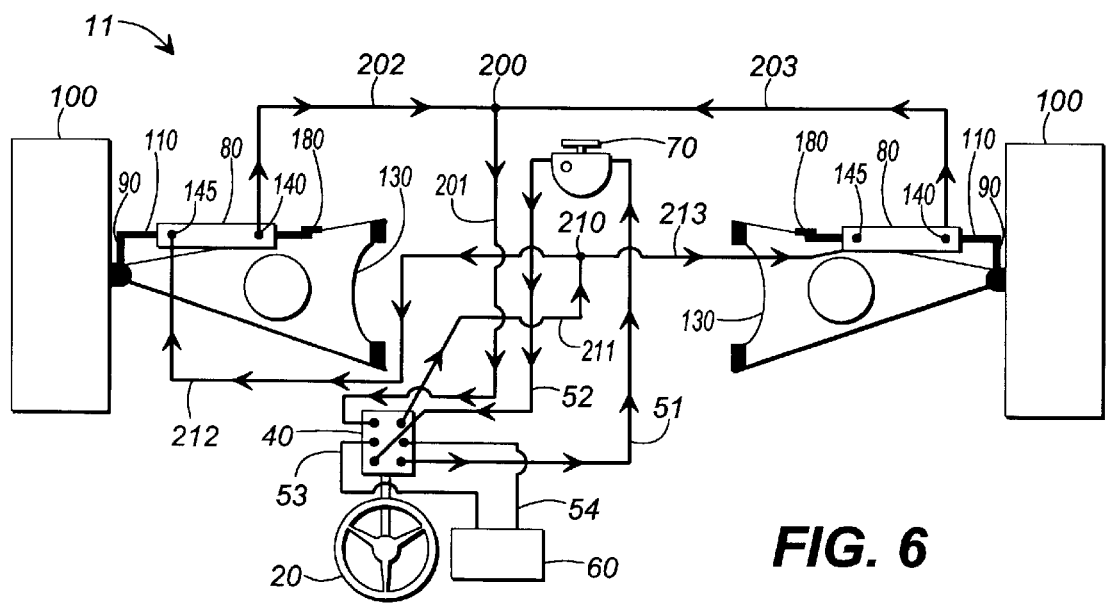
FIG. 6 is a schematic view of the components of the second embodiment of the present invention in making a right hand turn.

FIGS. 5 and 6 show a second embodiment of the invention, a steering system 11. The second embodiment uses two split hydraulic lines to circulate the hydraulic fluid evenly. As in the first embodiment, the steering valve 40 is connected to the hydraulic pump 70 via the outlet hydraulic line 51 and the inlet hydraulic line 52. Likewise, hydraulic fluid is drawn into the system 11 from the reservoir 60 via the inlet reservoir line 53 and the outlet reservoir line 54. Instead of left wheel hydraulic line 55, the steering valve 40 is connected to a left T-fitting 200 via a left hydraulic line 201. The left T-fitting 200 is in turn connected to a left wheel line 202 and a right wheel line 203. The left wheel line 202 is connected to the left cylinder 80 via the right hand cylinder fitting 140. Likewise, the right wheel line 203 is connected to the right cylinder 80 via the right hand cylinder fitting 140.

The steering valve 40 is also connected to a right T-fitting 210 via a right hydraulic line 211. The right T-fitting 210 is in turn connected to a left wheel line 212 and a right wheel line 213. The left wheel line 212 is connected to the left cylinder 80 via the left hand valve cylinder fitting 145. Likewise, the right wheel line 213 is connected to the right cylinder 80 via the left hand cylinder fitting 145.

FIG. 5 shows a left hand turn in the system of the second embodiment. When the steering wheel 20 is turned to the left, the steering valve 40 meters fluid into the left hydraulic line 201. At left hand T-fitting 200, the fluid splits into the left wheel line 202 to deliver fluid to the right side of the left cylinder 80 and into the right wheel line 203 to deliver fluid to the right side of the right cylinder 80. The fluid in both cylinders 80 forces each piston head 120 to the left. As the piston head 120 moves to the left, the piston head 120 forces fluid in the left side of each cylinder 80 back to the steering valve 40 via the right T-fitting 210 and right hydraulic line 211. Fluid from the left side of the left cylinder 80 travels through the left wheel line 212 and fluid from the left side of right cylinder 80 travels through the right wheel line 213. As the respective piston heads 120 and piston rods 110 are forced to the left, they force the respective steering arms 90 to the left, thereby turning the front wheels 100 to the left. The reverse takes place in the case of a right hand turn as is shown in FIG. 6.

In order to align the steering system 11 of the second embodiment, the driver simply needs to turn the steering wheel 20 all the way to the left and then all the way to the right. Turning the steering wheel 20 all the way in one direction will ensure that the stops 130 will hit the respective far cylinder walls 85, 86. When the stops 80 hit one of the far walls 85, 86, the hydraulic pump 70 will continue to force hydraulic fluid into both cylinders 80 until the cylinders 80 are completely full. Subsequently turning the steering wheel all the way in the other direction will ensure that volume is equal in both cylinders 80. If any air is in the cylinders 80, turning the wheel 20 in both directions will ensure that the air is removed via the bleed-off valves 147. The use of the location sensors 180 and an appropriate warning light on the dash will instruct the driver when a sufficient amount of fluid has been generated so as to stop holding the wheel in one direction, although the steering wheel 20 will stop turning when the stops 80 hit the respective far walls 85, 86 of the cylinders 80. The use of poppets 150 is not necessary in this embodiment.

From the foregoing description of the preferred embodiments and the several alternatives, other alternative constructions of the present invention may suggest themselves to those skilled in the art. Therefore, the scope of the present invention is to be limited only by the claims below and equivalents thereof.

We claim:

1. A self-aligning steering system in combination with a vehicle having a steering wheel means and a plurality of front wheels, comprising:

a hydraulic fluid circulation means positioned within said vehicle responsive to said steering wheel means; and a hydraulic cylinder means comprising a left hydraulic cylinder and a right hydraulic cylinder, said hydraulic cylinders positioned within said vehicle for maneuvering said plurality of front wheels in response to said hydraulic fluid circulation means;

said hydraulic cylinders comprising internal fluid release means in communication with said hydraulic fluid circulation means wherein the volume of hydraulic fluid in said left hydraulic cylinder and said right hydraulic cylinder is equalized such that said front wheels are in alignment.

2. The self-aligning steering system of claim 1, wherein said hydraulic fluid circulation means comprises a hydraulic steering valve.

3. The self-aligning steering system of claim 1, wherein said hydraulic fluid circulation means comprises a hydraulic pump.

4. The self-aligning steering system of claim 1, wherein said hydraulic fluid circulation means comprises a plurality of hydraulic lines for circulating hydraulic fluid.

5. The self-aligning steering system of claim 1, wherein said hydraulic cylinders comprise a piston rod with a piston head fixedly attached thereto.

6. The self-aligning steering system of claim 5, wherein said hydraulic cylinders comprise a stop means for limiting the movement of said piston head and said piston rod.

7. The self-aligning steering system of claim 6, wherein said stop means comprises rings positioned on said piston rod such that said piston head cannot contact a far wall of said cylinders.

8. The self-aligning steering system of claim 7, wherein said hydraulic fluid circulation means directs the flow of hydraulic fluid to and from said left hydraulic cylinder and said right hydraulic cylinder in response to said steering wheel means.

9. The self-aligning steering system of claim 8, wherein said hydraulic fluid circulation means further comprises recirculation means between said right hydraulic cylinder and said left hydraulic cylinder.

10. The self-aligning steering system of claim 9, wherein in response to said steering wheel means turning to the left, said hydraulic circulation system meters hydraulic fluid to the right side of said left hydraulic cylinder such said piston head within said left cylinder moves to the left and said hydraulic circulation system draws hydraulic fluid from the left side of said right cylinder such that said piston head within said right cylinder moves to the left.

11. The self-aligning steering system of claim 10, wherein in response to said piston heads moving to the left within said cylinders, said piston heads force said piston rods to the left such that said wheels are steered to the left.

12. The self-aligning steering system of claim 10, wherein said steering wheel means maintains said left turn such that said piston head continues to the left in said left cylinder until said stops contact said far wall of said cylinder and a build up of hydraulic fluid occurs behind said piston head in said left cylinder.

13. The self-aligning steering system of claim 12, wherein said internal fluid release means in said piston head in said left cylinder releases hydraulic fluid at a predetermined pressure.

14. The self-aligning steering system of claim 13, wherein hydraulic fluid is released to said right side of said right cylinder such that the volume of hydraulic fluid is equalized in said left cylinder and said right cylinder.

15. The self-aligning steering system of claim 9, wherein in response to said steering wheel means turning to the right, said hydraulic circulation system meters hydraulic fluid to the left side of said right hydraulic cylinder such said piston head within said right cylinder moves to the right and said hydraulic circulation system draws fluid from the right side of said left cylinder such that said piston head within said left cylinder moves to the right.

16. The self-aligning steering system of claim 15, wherein in response to said piston heads moving to the right within said cylinders, said piston heads force said piston rods to the right such that said wheels are steered to the right.

17. The self-aligning steering system of claim 15, wherein said steering wheel means maintains said right turn such that said piston head continues to the right in said right cylinder until said stops contact said far wall of said cylinder and a build up of hydraulic fluid occurs behind said piston head in said right cylinder.

18. The self-aligning steering system of claim 17, wherein said internal fluid release means in said piston head in said right cylinder releases hydraulic fluid at a predetermined pressure.

19. The self-aligning steering system of claim 18, wherein hydraulic fluid is released to said left side of said left cylinder such that the volume of hydraulic fluid is equalized in said left cylinder and said right cylinder.

20. The self-aligning steering system of claim 1, further comprising location sensors positioned adjacent to said hydraulic cylinders.

21. A self-aligning steering system in combination with a vehicle with a plurality of wheels, including a first front wheel and a second front wheel, a hydraulic steering system having a steering means, and a hydraulic fluid circulation means responsive to said steering means, comprising:

a first hydraulic cylinder positioned on said vehicle to steer said first front wheel in response to said hydraulic fluid circulation means;

a second hydraulic cylinder positioned on said vehicle to steer said second front wheel in response to said hydraulic fluid circulation means; and a hydraulic fluid recirculation means connected between said first hydraulic cylinder and said second hydraulic cylinder;

said first and said second hydraulic cylinder comprising internal fluid release means therein such that excess hydraulic fluid in said first cylinder may be released through said internal pressure release means and travel through said hydraulic fluid recirculation means to said second cylinder such that the amount of hydraulic fluid in each said cylinder is substantially equal.

22. A hydraulic steering system in combinations with a vehicle having a steering means and a hydraulic fluid circulation means responsive to said steering means, comprising:

a left front hydraulic cylinder positioned on said vehicle;

a right front hydraulic cylinder positioned on said vehicle;

a hydraulic fluid recirculation means positioned on said vehicle for fluid communication between said left front hydraulic cylinder and said right front hydraulic cylinder;

said left front hydraulic cylinder comprising a piston head therein, a right fluid valve connected to said hydraulic circulation means, and a left fluid valve connected to said hydraulic fluid recirculation means, and wherein said piston head comprises a left fluid release means; and said right front hydraulic cylinder comprising a piston head therein, a left fluid valve connected to said hydraulic circulation means, and a right fluid valve connected to said hydraulic fluid recirculation means, and wherein said piston head comprises a right fluid release means;

wherein any excess hydraulic fluid in either of said hydraulic cylinders is released through said fluid release means to the other of said cylinders through said hydraulic fluid release means.

23. A hydraulic steering system in combination with a vehicle with a plurality of wheels, including a first front wheel and a second front wheel, and a steering means, comprising:

a hydraulic fluid circulation means responsive to said steering means;

a first hydraulic cylinder with a first side, a second side, a piston head, and a piston rod functionally connected to said first front wheel so as to steer said first front wheel in response to said hydraulic fluid circulation means; and a second hydraulic cylinder with a first side, a second side, a piston head, and a piston rod functionally connected to said second front wheel so as to steer said second front wheel in response to said hydraulic fluid circulation means;

said hydraulic fluid circulation means comprising a first hydraulic line for transport of hydraulic fluid to and from said second side of said first cylinder and said second side of said second cylinder and a second hydraulic line for transport of fluid to and from said first side of said first cylinder and said first side of said second cylinder;

wherein in response to said steering means turning in a first direction, said hydraulic fluid circulation means forces fluid to said second side of said first cylinder and said second side of said second cylinder and draws fluid from said first side of said first cylinder and said first side of said second cylinder such that said piston heads in each said cylinder force said piston rods in said first direction so as to steer said wheels in said first direction.

24. A self-aligning steering system in combination with a vehicle having a steering wheel means and a plurality of front wheels, comprising:

a hydraulic fluid circulation system positioned within said vehicle responsive to said steering wheel means; and a left hydraulic cylinder and a right hydraulic cylinder, said hydraulic cylinders positioned within said vehicle for maneuvering said plurality of front wheels in response to said hydraulic fluid circulation system;

said hydraulic cylinders each comprising an internal piston head in communication with said hydraulic fluid circulation system;

said internal piston head comprising one or more fluid release poppets positioned therein, said one or more poppets releasing when a predetermined level of pressure develops behind said piston head such that the volume of hydraulic fluid in said left hydraulic cylinder and said right hydraulic cylinder may be equalized.

* * * * *